(12) United States Patent
Komachi et al.

(10) Patent No.: US 10,643,032 B2
(45) Date of Patent: May 5, 2020

(54) OUTPUT SENTENCE GENERATION APPARATUS, OUTPUT SENTENCE GENERATION METHOD, AND OUTPUT SENTENCE GENERATION PROGRAM

(71) Applicants: Mamoru Komachi, Nishitokyo (JP); Shin Kanouchi, Hino (JP); Tomoya Ogata, Hidaka (JP); Tomoya Takatani, Nissin (JP)

(72) Inventors: Mamoru Komachi, Nishitokyo (JP); Shin Kanouchi, Hino (JP); Tomoya Ogata, Hidaka (JP); Tomoya Takatani, Nissin (JP)

(73) Assignees: TOYOTA JIDOSHA KABUSHIKI KAISHA, Toyota-shi (JP); Tokyo Metropolitan University, Shinjyuku-ku (JP)

( * ) Notice: Subject to any disclaimer, the term of this patent is extended or adjusted under 35 U.S.C. 154(b) by 155 days.

(21) Appl. No.: 15/887,333

(22) Filed: Feb. 2, 2018

(65) Prior Publication Data

US 2018/0253420 A1 Sep. 6, 2018

(30) Foreign Application Priority Data

Mar. 2, 2017 (JP) ................................ 2017-039141

(51) Int. Cl.
*G06F 17/00* (2019.01)
*G06F 40/30* (2020.01)
(Continued)

(52) U.S. Cl.
CPC .............. *G06F 40/30* (2020.01); *G06F 40/56* (2020.01); *G06N 3/08* (2013.01); *G06N 3/0445* (2013.01)

(58) Field of Classification Search
CPC ....... G10L 15/16; G10L 15/18; G06F 17/274; G06F 17/2785
See application file for complete search history.

(56) References Cited

U.S. PATENT DOCUMENTS

2003/0004716 A1* 1/2003 Haigh ..................... G10L 15/10
704/238
2004/0260533 A1* 12/2004 Wakita ................ G06F 17/2795
704/4

(Continued)

FOREIGN PATENT DOCUMENTS

JP 1-255966 10/1989

OTHER PUBLICATIONS

Rohde, D. L. T., "The Simple Language Generator: Encoding complex languages with simple grammars", CMU-CS-99-123, XP055492204, Sep. 1999, pp. 1-15 with cover pages.

(Continued)

*Primary Examiner* — Daniel Abebe
(74) *Attorney, Agent, or Firm* — Oblon, McClelland, Maier & Neustadt, L.L.P.

(57) ABSTRACT

An output sentence generation apparatus for automatically generating one output sentence from a plurality of input keywords includes a candidate sentence generator incorporating a learned neural network configured to take in the plurality of keywords and generate a plurality of candidate sentences each including at least some of the plurality of keywords, and an evaluation outputter configured to calculate an overlap ratio for each of the plurality of candidate sentences generated by the candidate sentence generator and increase an evaluation of the candidate sentence with a small overlap ratio to thereby determine an output sentence from the plurality of candidate sentences. The overlap ratio is the number of occurrences of an overlapping word with respect (Continued)

to the number of occurrences of all words included in the corresponding candidate sentence.

15 Claims, 4 Drawing Sheets

(51) Int. Cl.
*G06N 3/08* (2006.01)
*G06F 40/56* (2020.01)
*G06N 3/04* (2006.01)

(56) References Cited

U.S. PATENT DOCUMENTS

| | | | |
|---|---|---|---|
| 2007/0129935 A1* | 6/2007 | Uchimoto | G06F 17/2836 704/9 |
| 2015/0261745 A1* | 9/2015 | Song | G06F 17/2881 704/9 |
| 2016/0196257 A1 | 7/2016 | Choi | |
| 2017/0242915 A1* | 8/2017 | Torisawa | G06F 16/3329 |

OTHER PUBLICATIONS

Achananuparp, P. et al., "The Evaluation of Sentence Similarity Measures", Data Warehousing and Knowledge Discovery, Lecture Notes in Computer Science 5182, XP019104263, 2008, pp. 305-316.

"Stop words", Wikipedia, XP055492916, Dec. 22, 2016, pp. 1-2.

Ilya Sutskever, et al. "Sequence to Sequence Learning with Neural Networks", NIPS, 2014, 9 pages.

Kyunghyun Cho, et al. "On the Properties of Neural Machine Translation: Encoder-Decoder Approaches", SSST, 2014, 9 pages.

Liang Lu, et al. "On Training the Recurrent Neural Network Encoder-Decoder for Large Vocabulary End-to-end Speech Recognition", ICASSP, 2015, 5 pages.

Iulian V. Serban, et al. "Building End-To-End Dialogue Systems Using Generative Hierarchical Neural Network Models", AAAI, 2016, 8 pages.

Xuezhe Ma, et al. "End-to-end Sequence Labeling via Bi-directional LSTM-CNNs-CRF", ACL, 2016, 12 pages.

Ardrej Karpathy, et al. "Deep Visual-Semantic Alignments for Generating Image Descriptions", CVRP, 2015, 17 pages.

Ondrej Dusek, et al. "Sequence-to-Sequence Generation for Spoken Dialogue via Deep Syntax Trees and Strings", ACL, 2016, 7 pages.

Dzmitry Bahdanau, et al. "Neural Machine Translation by Jointly Learning to Align and Translate", ICLR, 2015, 15 pages.

Tsung-Hsien Wen, et al. "Semantically Conditioned LSTM-based Natural Language Generation for Spoken Dialogue Systems", EMNLP, 2015, 11 pages.

\* cited by examiner

OUTPUT SENTENCE GENERATION APPARATUS, OUTPUT SENTENCE GENERATION METHOD, AND OUTPUT SENTENCE GENERATION PROGRAM

CROSS REFERENCE TO RELATED APPLICATIONS

This application is based upon and claims the benefit of priority from Japanese patent application No. 2017-39141, filed on Mar. 2, 2017, the disclosure of which is incorporated herein in its entirety by reference.

BACKGROUND

The present disclosure relates to an output sentence generation apparatus, an output sentence generation method, and an output sentence generation program.

In a natural language processing system, a sentence generation technique using a neural network has come to be known (see, for example, Japanese Unexamined Patent Application Publication No. H01-255966). Recently, sentence generation apparatuses using learned neural networks have become known. The learned neural networks, when provided with keywords, generate sentences taking therein a moderate number of the keywords.

SUMMARY

When a neural network learns, with some learning data, it learns that sentences including overlapping provided keywords are correct sentences. When the learned neural network that learned in this way is used, there has been a problem that sentences taking therein overlapping provided keywords are frequently generated. In actual natural sentences, there are few cases where specific words overlap. Thus, such sentences including overlapping keywords are desirably less frequently generated. However, in order to achieve this purpose, it is necessary to prepare an enormous amount of learning data to improve learning accuracy of the neural network. This requires a large workload. Further, the convenience of using existing neural networks would be lost.

The present disclosure provides a technique for generating an output sentence that avoids overlapping keywords to thereby give a more natural impression while using a learned neural network.

A first example aspect of the present disclosure is an output sentence generation apparatus for automatically generating one output sentence from a plurality of input keywords. The output sentence generation apparatus includes: a candidate sentence generator incorporating a learned neural network configured to take in the plurality of keywords and generate a plurality of candidate sentences each including at least some of the plurality of keywords; and an evaluation outputter configured to calculate an overlap ratio for each of the plurality of candidate sentences generated by the candidate sentence generator and increase an evaluation of the candidate sentence with a small overlap ratio to thereby determine an output sentence from the plurality of candidate sentences. The overlap ratio is the number of occurrences of an overlapping word with respect to the number of occurrences of all words included in the corresponding candidate sentence.

According to the output sentence generation apparatus configured in this way, there is no need to readjust the learned neural network. Further, the plurality of candidate sentences output from the learned neural network are evaluated as to whether they include the overlapping keywords. Therefore, it is possible to generate the output sentence that avoids overlapping keywords by simple processing while utilizing existing resources.

Further, the above evaluation outputter may increase the evaluation of the candidate sentence with a small overlap ratio, calculate a keyword ratio for each of the plurality of candidate sentences, and increase an evaluation of the candidate sentence with a small keyword ratio to thereby determine the output sentence from the plurality of candidate sentences and output the output sentence. The keyword ratio is the number of elements in an intersection of a group of the plurality of keywords and a group of all words included in the corresponding candidate sentence with respect to the number of elements in a union of the group of the plurality of keywords and the group of all the words included in the corresponding candidate sentence. In this way, by making the evaluation also in consideration of the keyword ratio, it is possible to reduce the possibility that a sentence with a small number of the keywords taken therein may be determined as the output sentence.

In this case, the above candidate sentence generator generates an evaluation score N together with each of the plurality of candidate sentences. The higher a possibility that the candidate sentence might be determined as the output sentence, the greater a value of the evaluation score N becomes. The evaluation outputter calculates, as the overlap ratio, P=1-(the number of occurrences of the overlapping word)/(the number of occurrences of all the words). The evaluation outputter calculates, as the keyword ratio, J=(the number of elements in the intersection of the group of the plurality of keywords and the group of all the words included in the corresponding candidate sentence)/(the number of elements in the union of the group of the plurality of keywords and the group of all the words included in the corresponding candidate sentence). The evaluation outputter can output the candidate sentence with a largest value of N×P×J as the output sentence. In this way, by replacing the evaluation with a specific and simple numerical value, it is possible to more quickly determine the output sentence.

In such an evaluation, when the overlap ratio is calculated and when the keyword ratio is calculated, particles, auxiliary verbs, and conjunctions may be excluded. Particles, auxiliary verbs, and conjunctions among words are heterogeneous as compared with other parts of speech from the viewpoint of the impression that overlapping word gives to natural sentences. Therefore, in the above method, the words to be counted as elements are limited to the content words excluding particles, auxiliary verbs, and conjunctions. Further, in addition to excluding particles, auxiliary verbs, and conjunctions specific parts of speech may be excluded. By excluding specific parts of speech, it is possible to output highly accurate output sentences according to the purpose of use and usage status. Moreover, an increase in a calculation speed can be expected.

A second example aspect of the present disclosure is an output sentence generation method for automatically generating one output sentence from a plurality of input keywords. The output sentence generation method includes: taking in the plurality of keywords and, using a learned neural network, generating a plurality of candidate sentences each including at least some of the plurality of keywords; and calculating an overlap ratio for each of the plurality of candidate sentences generated in the generating and increasing an evaluation of the candidate sentence with a small overlap ratio to thereby determine an output sentence from the plurality of candidate sentences. The overlap ratio is the number of occurrences of an overlapping word with respect to the number of occurrences of all words included in the corresponding candidate sentence.

A third example aspect of the present disclosure is an output sentence generation program for automatically generating one output sentence from a plurality of input keywords. The output sentence generation program causes a computer to execute: taking in the plurality of keywords and, using a learned neural network, generating a plurality of candidate sentences each including at least some of the plurality of keywords; and calculating an overlap ratio for each of the plurality of candidate sentences generated in the generating and increasing an evaluation of the candidate sentence with a small overlap ratio to thereby determine an output sentence from the plurality of candidate sentences. The overlap ratio being the number of occurrences of an overlapping word with respect to the number of occurrences of all words included in the corresponding candidate sentence. The second and third example aspects can be expected to achieve the same effects as those of the first example aspect.

According to the present disclosure, it is possible to generate an output sentence that avoids overlapping keywords to thereby give a more natural impression while using a learned neural network.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, although the present disclosure will be described with reference to embodiments of the invention, the present disclosure according to claims is not limited to the following embodiment. Moreover, all the components described in the following embodiment are not necessarily indispensable for means to solve problems.

Figure 1:
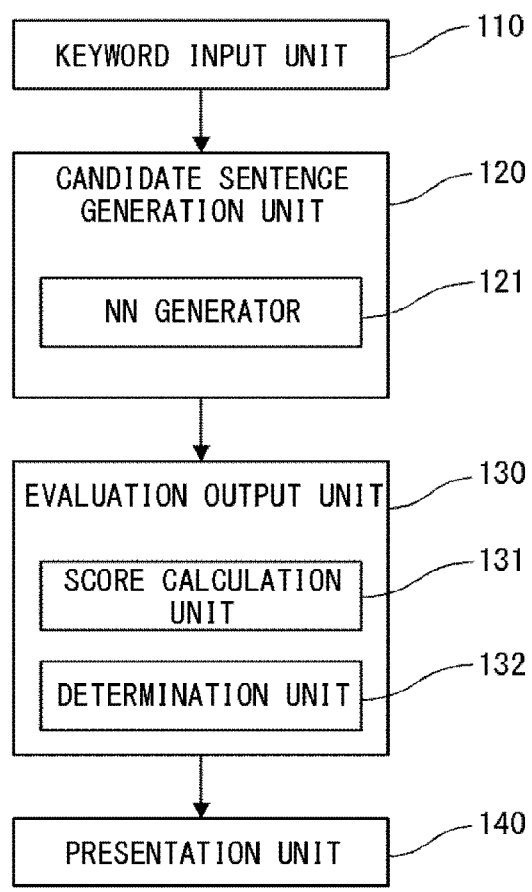
FIG. 1 shows a functional block diagram of an output sentence generation apparatus according to the embodiment.

FIG. 1 is a functional block diagram of an output sentence generation apparatus 100 according to this embodiment. When a plurality of keywords are provided, the output sentence generation apparatus 100 automatically generates one sentence including at least some of these keywords and outputs the sentence. For example, the output sentence generation apparatus 100 is incorporated in a humanoid robot that conducts a speech dialogue with a user. When the humanoid robot replies to confirm a user's intention, it passes the keywords extracted from an utterance of the user to the output sentence generation apparatus 100, receives the sentence generated as a result thereof, and utters the sentence from a speaker or the like. Alternatively, a server may function as the output sentence generation apparatus 100. For example, the server may generate a sentence using the keywords transmitted from a user's terminal via a network and send back the sentence to the terminal.

As described above, the output sentence generation apparatus 100 may not include an independent structure as hardware. Alternatively, the output sentence generation apparatus 100 may be incorporated as a part of another apparatus. Further, a chip such as an ASIC may be an entity of the output sentence generation apparatus 100.

The output sentence generation apparatus 100 described in this embodiment includes a keyword input unit 110 as an input interface and a presentation unit 140 as an output interface. The output sentence generation apparatus 100 further includes a candidate sentence generation unit 120 and an evaluation output unit 130, which are calculation units performing calculations. For example, each of the candidate sentence generation unit 120 and the evaluation output unit 130 may be composed of a CPU as a general-purpose arithmetic processing chip or of a dedicatedly-designed ASIC.

Further, the calculation unit may include, for example, a memory that stores a language database organized into a corpus or may be configured to access a language database stored in an external memory. The candidate sentence generation unit 120 generates a sentence by referring to the language database.

The keyword input unit 110 is composed of, for example, a microphone as hardware and a speech analysis unit that analyzes an input speech. In this case, the keyword input unit 110 extracts keywords by speech analysis and passes them to the candidate sentence generation unit 120. The keyword input unit 110 may accept a keyword input directly from the user via a keyboard or the like. When the output sentence generation apparatus 100 is incorporated in another apparatus, the keyword input unit 110 is an interface that accepts a target sentence or keywords from the output sentence generation apparatus 100.

The presentation unit 140 is composed of, for example, a speaker as hardware and a signal conversion unit that converts the generated sentence into a speech signal. In this case, the presentation unit 140 converts one sentence received from the evaluation output unit 130 into a speech signal and utters the speech signal from the speaker. The presentation unit 140 may be a display unit that displays, in text form, one sentence received from the evaluation output unit 130. When the output sentence generation apparatus 100 is incorporated in another apparatus, the presentation unit 140 is an interface that passes the sentence received from the evaluation output unit 130 to the output sentence generation apparatus 100.

The candidate sentence generation unit 120 is composed by incorporating therein an NN generator 121, which is a learned neural network. The candidate sentence generation unit 120 may be configured to be capable of updating the NN generator 121 via a communication interface.

The NN generator 121 takes in the keywords provided from the keyword input unit 110, generates a plurality of candidate sentences each including at least some of these keywords, and calculates a basic score of each of the candidate sentences. The basic score is evaluated by the NN generator 121. The basic score indicates as to how suitable the candidate sentence is as an output sentence. The basic score is defined in such a way that, for example, between 0 and 1, the closer the basic score is to 1, the more suitable the candidate sentence is as the output sentence. In other words, the NN generator 121 makes the evaluation such that the closer the calculated value is to 1, the more suitable the candidate sentence is as the output sentence.

In the neural network implemented as the NN generator 121, model learning is performed by an external computer. In the model learning, content words excluding pronouns, articles, auxiliary particles, auxiliary verbs, and conjunctions are extracted from correct sentences provided as supervised data, one sentence is generated from the extracted content words, and errors in respective layers are repeatedly updated so that the generated sentence becomes close to the correct sentence.

The candidate sentence generation unit 120 according to this embodiment can use various types of known neural networks as the NN generator 121. Examples of the known neural networks that can be used as the NN generator 121 are: a sentence generation module by seq2seq using LSTM (see, for example, Ilya Sutskever, Oriol Vinyals, and Quoc V Le, "Sequence to sequence learning with neural networks", In NIPS. 2014. or Kyunghyun Cho, Bart van Merrienboer, Dzmitry Bandanau, and Yoshua Bengio, "On the properties of neural machine translation: Encoder-decoder approaches,"In SSST, 2014.), a sentence generation module by seq2seq using RNN (see, for example, Liang Lu, Xingxing Zhang, Steve Renais, "On training the recurrent neural network encoder-decoder for large vocabulary end-to-end speech recognition," In ICAS SP, 2016. or Iulian V. Serban, Alessandro Sordoni, Yoshua Bengio, Aaron Courville and Joelle Pineauy, "Building End-To-End Dialogue Systems Using Generative Hierarchical Neural Network Models," https://arxiv.org/pdf/1507.04808.pdf), a sentence generation module by seq2seq using Bi-directional LSTM (see, for example, Xuezhe Ma, Eduard Hovy, "End-to-end Sequence Labeling via Bi-directional LSTM-CNNs-CRF," https://arxiv.org/abs/1603.01354 or Andrej Karpathy, Li Fei-Fei, "Deep Visual-Semantic Alignments for Generating Image Descriptions,"in CVPR, 2015.), a sentence generation module disclosed in Japanese Unexamined Patent Application Publication No. H01-255966, and a sentence generation module disclosed in Dusek+, 2016 (see Ondrej Dusek and Filip Jurcicek, "Sequence-to-sequence generation for spoken dialogue via deep syntax trees and strings," In ACL, 2016.)

The candidate sentence generated by the NN generator 121 may use the provided keyword multiple times. This is because the incorporated neural network has learned correct sentences including the same word multiple times during learning. However, in actual natural sentences, there are few cases where specific words overlap. Thus, such sentences including overlapping keywords are desirably less frequently generated. However, in order to achieve this purpose, it is necessary to prepare enormous amount of learning data to improve learning accuracy of the neural network. This requires a large amount of workloads. Further, the convenience of using existing neural networks would be lost.

For the above reason, in this embodiment, the output candidate sentence is further analyzed while the learned neural network is still used in order to avoid the candidate sentence that uses the overlapping keyword. The evaluation output unit 130 calculates an overlap ratio and a keyword ratio to evaluate the candidate sentence. The overlap ratio indicates how much the content words overlap in each of the plurality of candidate sentences generated by the candidate sentence generation unit 120. The keyword ratio indicates how many of the plurality of provided keywords are adopted in each of the plurality of candidate sentences generated by the candidate sentence generation unit 120. Then, evaluation output unit 130 determines the candidate sentence with the highest evaluation as the output sentence and outputs it to the presentation unit 140. Hereinafter, a method for calculating and evaluating the overlap ratio and the keyword ratio will be described below by showing a specific example.

Figure 2:
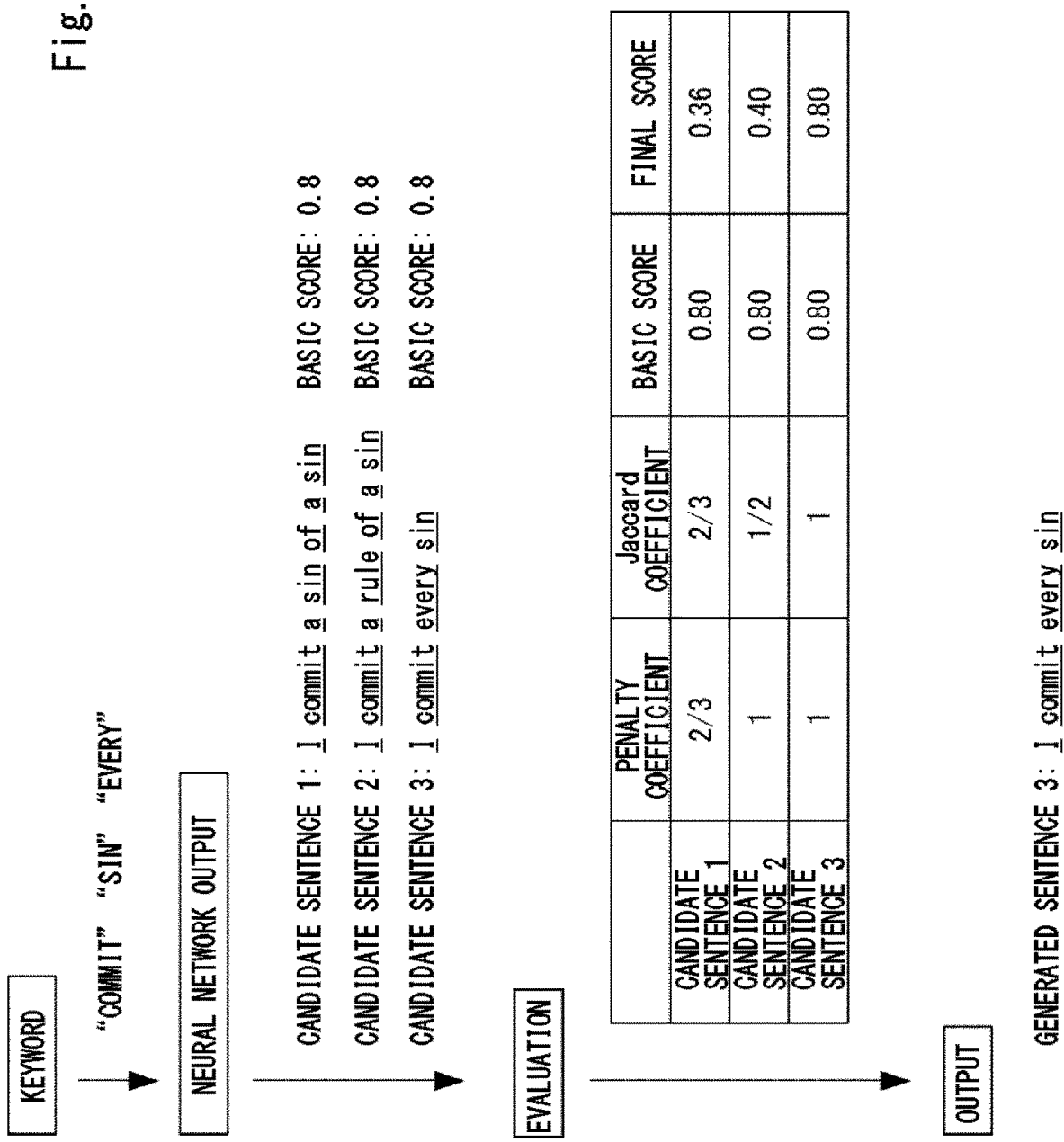
FIG. 2 is a diagram showing a specific example from input to output.

FIG. 2 is a diagram showing the specific example from input to output. Here, a case is described, in which three content words "commit", "sin", and "every" are provided as examples of the keywords. The output sentence generation apparatus 100 aims to output a natural sentence which includes as many of these keywords as possible and also avoids overlapping of the same keyword.

The NN generator 121 generates a plurality of sentences from the provided keywords "commit", "sin", and "every". Among the generated sentences, three sentences with high basic scores are determined as the candidate sentences. In this case, suppose that a candidate sentence 1, which is "I commit a sin of a sin.", a candidate sentence 2, which is "I commit a rule of a sin.", and a candidate sentence 3, which is "I commit every sin." have been generated. Further, in this example, it is assumed that the basic score for the three candidate sentences is calculated as N=0.8.

The evaluation output unit 130 receives these three candidate sentences, and the score calculation unit 131 calculates evaluation values. The score calculation unit 131 first calculates a penalty coefficient. The penalty coefficient is one index of the overlap ratio. The overlap ratio represents a ratio of the number of occurrences of the overlapping content word with respect to the number of occurrences of all the content words included in the candidate sentence. To be more specific, the penalty coefficient P is defined as follows.

P=1-(the number of occurrences of the overlapping content word)/(the number of occurrences of all the content words)

As there are three content words included in the candidate sentence 1, which are "sin", "sin", and "commit", the number of occurrences of the content words in the candidate sentence 1 is "3". Further, in the candidate sentence 1, "sin" appears twice. Thus, the number of occurrences of the overlapping content word is "1". Note that the number of occurrences when the overlapping identical content word appears n (n is a natural number of two or greater) times in the candidate sentence is counted as "n-1". Therefore, the penalty coefficient of the candidate sentence 1 is P=1-1/3=2/3.

As there are three content words included in the candidate sentence 2, which are "sin", "rule", and "commit", the number of occurrences of the content words in the candidate sentence 2 is "3". Further, in the candidate sentence 2, there is no overlapping content word. Thus, the number of occurrences of the overlapping content word is "0". Therefore, the penalty coefficient of the candidate sentence 2 is P=1-0/3=1.

As there are three content words included in the candidate sentence 3, which are "sin", "every", and "commit", the number of occurrences of the content words of the candidate sentence 3 is "3". Further, in the candidate sentence 3, there is no overlapping content word.

Thus, the number of occurrences of the overlapping content word is "0". Therefore, the penalty coefficient of the candidate sentence 3 is P=1-0/3=1.

Then, the score calculation unit 131 calculates a Jaccard coefficient. The Jaccard coefficient is one index of the keyword ratio. The keyword ratio represents the number of elements in an intersection of a group of keywords and a group of all the content words included in the candidate sentence with respect to the number of elements in a union of the group of keywords and the group of all the content words included in the candidate sentence. To be more specific, the Jaccard coefficient is defined as follows.

J=(the number of elements in the intersection of the group of keywords and the group of all the content words included in the candidate sentence)/(the number of elements in a union of the group of keywords and the group of all the content words included in the candidate sentence)

The group of keywords is {"commit" "sin" "every"}, and the group of all the content words included in candidate sentence 1 is {"sin" "commit"}. The intersection of these groups is {"commit" "sin" }, and the number of elements is "2". Likewise, the union of these groups is {"commit" "sin" "every"}, and the number of elements is "3". Accordingly, the Jaccard coefficient of the candidate sentence 1 is J=2/3.

Similarly, the group of all the content words included in the candidate sentence 2 is {"sin" "rule" "committed"}. The intersection with the group of keywords is {"commit" "sin"}, and the number of elements is "2". Likewise, the union is {"commit" "sin" "every" "rule"}, and the number of elements is "4". Accordingly, the Jaccard coefficient of the candidate sentence 2 is J=2/4=1/2.

Similarly, the group of all the content words included in the candidate sentence 3 is {"sin" "every" "commit"}. The intersection with the group of keywords is {"commit" "sin" "every"}, and the number of elements is "3". Likewise, the union of these groups is {"commit" "sin" "every"}, and the number of elements is "3". Accordingly, the Jaccard coefficient of the candidate sentence 3 is J=3/3=1.

The determination unit 132 receives the P value and the J value of each candidate sentence calculated by the score calculation unit 131, calculates N×P×J for each candidate sentence, and determines the calculated value as a final score. Specifically, the final score of the candidate sentence 1 is 0.36, the final score of the candidate sentence 2 is 0.40, and the final score of the candidate sentence 3 is 0.80. Accordingly, the determination unit 132 determines the candidate sentence 3 with the highest score as the output sentence.

Note that particles, auxiliary verbs, and conjunctions among words are heterogeneous as compared with other parts of speech from the viewpoint of the impression that overlapping word gives to natural sentences. Therefore, in the above method, the words to be counted, in each of the candidate sentences, as elements are limited to the content words excluding pronouns, articles, particles, auxiliary verbs, and conjunctions. However, all words including pronouns, articles, particles, auxiliary verbs, and conjunctions may be counted according to the purpose. Conversely, even among content words, certain parts of speech such as adverbs and adjectives may be excluded. In any case, an appropriate adjustment may be made according to the purpose of use and usage status of the output sentence generation apparatus 100. By making an adjustment in this way, it is possible to output highly accurate output sentences according to the purpose of use and usage status. Moreover, as the calculation is simplified, an improvement in the calculation speed can be expected.

In the above method, the penalty coefficient is used as the overlap ratio. However, any specific calculation formula may be used as long as it is a coefficient that increases the evaluation of candidate sentences with small overlap ratios. Similarly, in the above method, the Jaccard coefficient is used as the keyword ratio. However, any specific calculation formula may be used as long as it is a coefficient that increases the evaluation of candidate sentences with large keyword ratios.

Moreover, in the above example, it is described that the basic score is the same for the candidate sentences in order to clarify the influence of the penalty coefficient and the Jaccard coefficient on the score. However, the actual NN generator 121 may give different basic scores. Therefore, in regard to a plurality of candidate sentences having the same product of the penalty coefficient and the Jaccard coefficient, the selection of whether they are determined as the output sentence is made according to the magnitude of the basic scores of the candidate sentences.

In the above example, both the overlap ratio and the keyword ratio are considered. However, in terms of avoiding candidate sentences including overlapping provided keywords, only the overlap ratio may be considered. In that case, the basic score may be multiplied by the penalty coefficient to obtain the final score.

Figure 3:
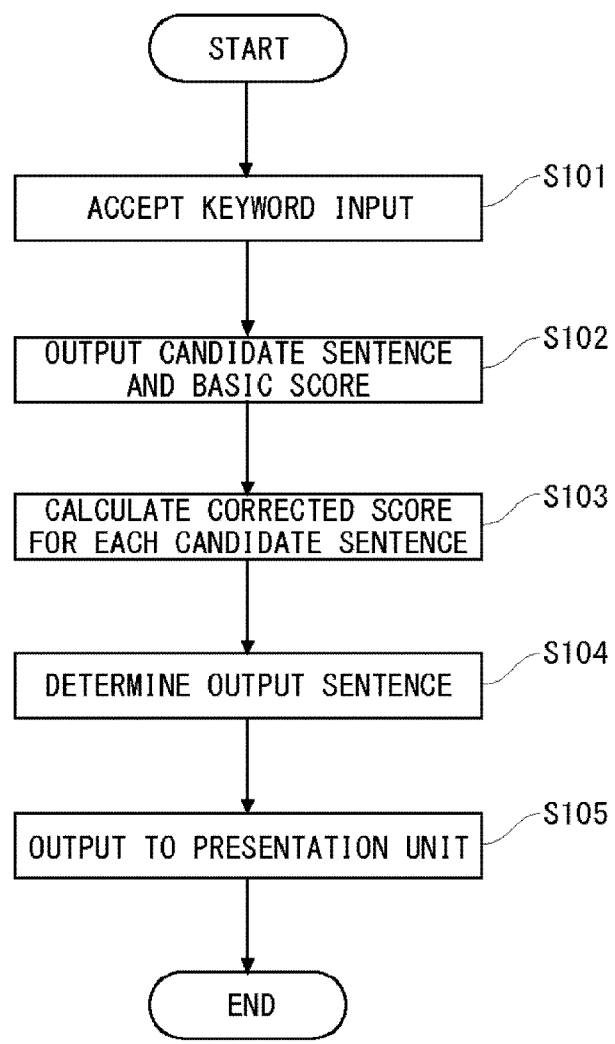
FIG. 3 is a flowchart showing an overall processing flow.

Next, an overall processing flow of the output sentence generation apparatus 100 will be described. FIG. 3 is a flowchart showing the overall processing flow. The illustrated processing flow is achieved by executing an output sentence generation program read out from a memory.

In Step S101, the keyword input unit 110 accepts an input of a plurality of keywords. Depending on the configuration of the apparatus, as described above, the keyword input unit 110 may extract keywords from an utterance of the user or may directly accept the keywords from a keyboard or the like.

In the subsequent Step S102, the candidate sentence generation unit 120 generates a plurality of candidate sentences and respective basic scores and outputs them. More specifically, as described above, the NN generator 121, which is the learned neural network, performs the processing.

In Step S103, the evaluation output unit 130 receives the plurality of candidate sentences and respective basic scores, and the score calculation unit 131 calculates a corrected score of each candidate sentence. The corrected score is a score obtained by correcting the basic score. In the example described with reference to FIG. 2, the corrected score is obtained by multiplying the basic score by the penalty coefficient and the Jaccard coefficient In Step S104, in the evaluation output unit 130, the determination unit 132 compares the corrected score of the plurality of candidate sentences to one another, determines the candidate sentence with the highest correction score as the output sentence, and passes the output sentence to the presentation unit 140. Depending on the configuration of the apparatus, as described above, the presentation unit 140 utters the determined sentence from a speaker or displays it on a display panel in a text sentence. When the presentation of the output sentence is completed, a series of processing is ended.

Figure 4:
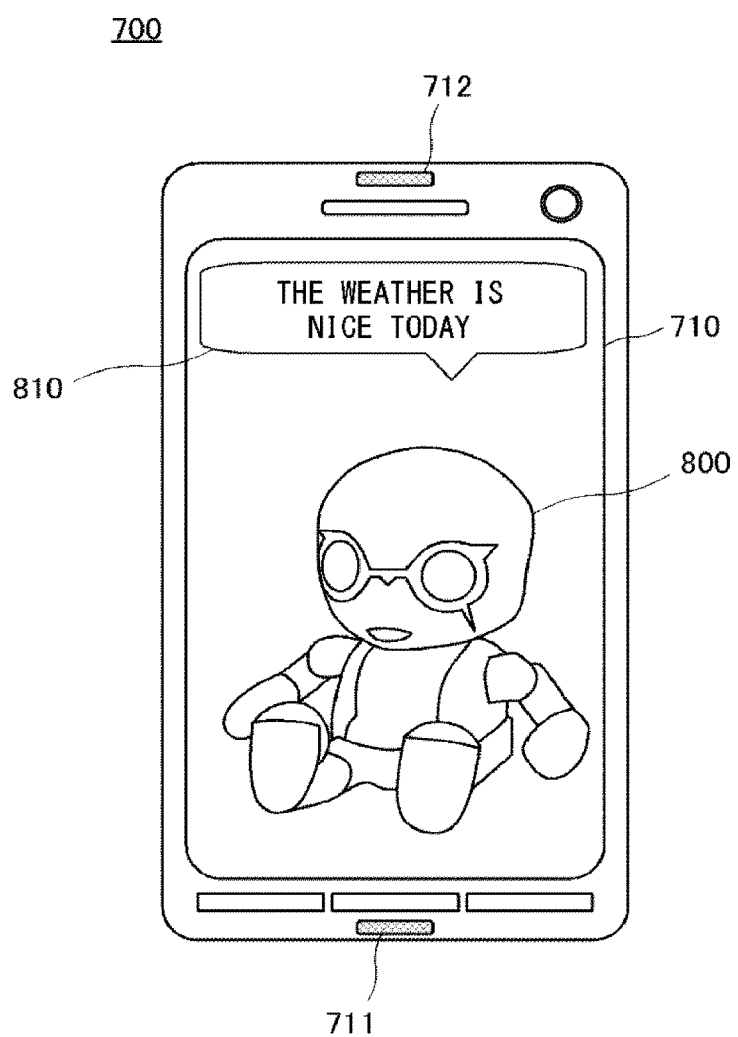
FIG. 4 is a diagram showing a smartphone as an application example of a device.

FIG. 4 is a diagram showing a smartphone 700 as an application example of a device. As shown in FIG. 4, the output sentence generation apparatus 100 can be incorporated in a smartphone. The smartphone 700 includes a display unit 710, a microphone 711, and a speaker 712. The microphone 711 functions as a part of the keyword input unit 110. The display unit 710 and the speaker 712 function as a part of the presentation unit 140.

The presentation unit 140 may display, for example, a character 800 representing a robot in CG on the display unit 710. The character 800 has a head and a body like a dialog robot. The presentation unit 140 can express actions by animation in accordance with an utterance of the output sentence. The output sentence may be uttered from the speaker 712. Additionally or alternatively, a balloon 810 may be displayed on the display unit 710 and the output sentence may be informed to the user in text form.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An output sentence generation apparatus for automatically generating one output sentence from a plurality of input keywords, the output sentence generation apparatus comprising:
    circuitry configured to:
    take in the plurality of keywords;
    generate, using a learned neural network, a plurality of candidate sentences each including at least some of the plurality of keywords;
    calculate an overlap ratio for each of the generated plurality of candidate sentences; and
    increase an evaluation of a candidate sentence with a small overlap ratio to thereby determine an output sentence from the plurality of candidate sentences, wherein
    the overlap ratio is a number of occurrences of an overlapping word in a respective candidate sentence with respect to a number of occurrences of all words included in the respective candidate sentence, and
    the overlapping word is a first word in the respective candidate sentence that is the same as a second word in the respective candidate sentence.

2. The output sentence generation apparatus according to claim 1, wherein the circuitry is configured to:
    calculate a keyword ratio for each of the plurality of candidate sentences;
    increase an evaluation of a candidate sentence with a small keyword ratio to thereby determine the output sentence from the plurality of candidate sentences; and
    output the output sentence,
    wherein the keyword ratio is a number of elements in an intersection of a group of the plurality of keywords and a group of all the words included in the respective candidate sentence with respect to a number of elements in a union of the group of the plurality of keywords and the group of all the words included in the respective candidate sentence.

3. The output sentence generation apparatus according to claim 2, wherein the circuitry is configured to:
    generate an evaluation score N together with each of the plurality of candidate sentences, where the higher a possibility that one of the a plurality of candidate sentences might be determined as the output sentence, the greater a value of the evaluation score N becomes,
    calculate, as the overlap ratio,
        P=1−(the number of occurrences of the overlapping word)(the number of occurrences of all the words),
    calculate, as the keyword ratio,
        J=(the number of elements in the intersection of the group of the plurality of keywords and the group of all the words included in the respective candidate sentence)/(the number of elements in the union of the group of the plurality of keywords and the group of all the words included in the respective candidate sentence), and
    output a candidate sentence with a largest value of N+P+J as the output sentence.

4. The output sentence generation apparatus according to claim 2, wherein when the overlap ratio is calculated and when the keyword ratio is calculated, particles, auxiliary verbs, and conjunctions are excluded.

5. The output sentence generation apparatus according to claim 4, wherein when the overlap ratio is calculated and when the keyword ratio is calculated, specific parts of speech are excluded.

6. An output sentence generation method for automatically generating one output sentence from a plurality of input keywords, the output sentence generation method comprising:
    taking in the plurality of keywords;
    generating, using a learned neural network, a plurality of candidate sentences each including at least some of the plurality of keywords;
    calculating an overlap ratio for each of the generated plurality of candidate sentences; and
    increasing an evaluation of a candidate sentence with a small overlap ratio to thereby determine an output sentence from the plurality of candidate sentences, wherein
    the overlap ratio is a number of occurrences of an overlapping word in a respective candidate sentence with respect to a number of occurrences of all words included in the respective candidate sentence, and
    the overlapping word is a first word in the respective candidate sentence that is the same as a second word in the respective candidate sentence.

7. The output sentence generation method according to claim 6, further comprising:
    calculating a keyword ratio for each of the plurality of candidate sentences;
    increasing an evaluation of a candidate sentence with a small keyword ratio to thereby determine the output sentence from the plurality of candidate sentences; and
    outputting the output sentence,
    wherein the keyword ratio is a number of elements in an intersection of a group of the plurality of keywords and a group of all the words included in the respective candidate sentence with respect to a number of elements in a union of the group of the plurality of keywords and the group of all the words included in the respective candidate sentence.

8. The output sentence generation method according to claim 7, further comprising:
    generating an evaluation score N together with each of the plurality of candidate sentences, where the higher a possibility that one of the a plurality of candidate sentences might be determined as the output sentence, the greater a value of the evaluation score N becomes, calculating, as the overlap ratio, P=1−(the number of occurrences of the overlapping word)(the number of occurrences of all the words), calculating, as the keyword ratio, J=(the number of elements in the intersection of the group of the plurality of keywords and the group of all the words included in the respective candidate sentence)(the number of elements in the union of the group of the plurality of keywords and the group of all the words included in the respective candidate sentence), and outputting a candidate sentence with a largest value of N+P+J as the output sentence.

9. The output sentence generation method according to claim 7, wherein when the overlap ratio is calculated and when the keyword ratio is calculated, particles, auxiliary verbs, and conjunctions are excluded.

10. The output sentence generation method according to claim 9, wherein when the overlap ratio is calculated and when the keyword ratio is calculated, specific parts of speech are excluded.

11. A non-transitory computer readable medium storing an output sentence generation program for automatically generating one output sentence from a plurality of input keywords, the output sentence generation program causing a computer to execute:

taking in the plurality of keywords;

generating, using a learned neural network, a plurality of candidate sentences each including at least some of the plurality of keywords;

calculating an overlap ratio for each of the generated plurality of candidate sentences; and increasing an evaluation of a candidate sentence with a small overlap ratio to thereby determine an output sentence from the plurality of candidate sentences, wherein the overlap ratio is a number of occurrences of an overlapping word in a respective candidate sentence with respect to a number of occurrences of all words included in the respective candidate sentence, and the overlapping word is a first word in the respective candidate sentence that is the same as a second word in the respective candidate sentence.

12. The non-transitory computer readable medium according to claim 11, the output sentence generation program causing the computer to execute:

calculating a keyword ratio for each of the plurality of candidate sentences;

increasing an evaluation of a candidate sentence with a small keyword ratio to thereby determine the output sentence from the plurality of candidate sentences; and outputting the output sentence, wherein the keyword ratio is a number of elements in an intersection of a group of the plurality of keywords and a group of all the words included in the respective candidate sentence with respect to a number of elements in a union of the group of the plurality of keywords and the group of all the words included in the respective candidate sentence.

13. The non-transitory computer readable medium according to claim 12, the output sentence generation program causing the computer to execute:

generating an evaluation score N together with each of the plurality of candidate sentences, where the higher a possibility that one of the a plurality of candidate sentences might be determined as the output sentence, the greater a value of the evaluation score N becomes, calculating, as the overlap ratio, P=1−(the number of occurrences of the overlapping word)(the number of occurrences of all the words), calculating, as the keyword ratio, J=(the number of elements in the intersection of the group of the plurality of keywords and the group of all the words included in the respective candidate sentence)(the number of elements in the union of the group of the plurality of keywords and the group of all the words included in the respective candidate sentence), and outputting a candidate sentence with a largest value of N+P+J as the output sentence.

14. The non-transitory computer readable medium according to claim 12, wherein when the overlap ratio is calculated and when the keyword ratio is calculated, particles, auxiliary verbs, and conjunctions are excluded.

15. The non-transitory computer readable medium according to claim 14, wherein when the overlap ratio is calculated and when the keyword ratio is calculated, specific parts of speech are excluded.

* * * * *